(No Model.) 6 Sheets—Sheet 2.
H. P. HOLT & F. W. CROSSLEY.
GAS MOTOR ENGINE.
No. 370,258. Patented Sept. 20, 1887.
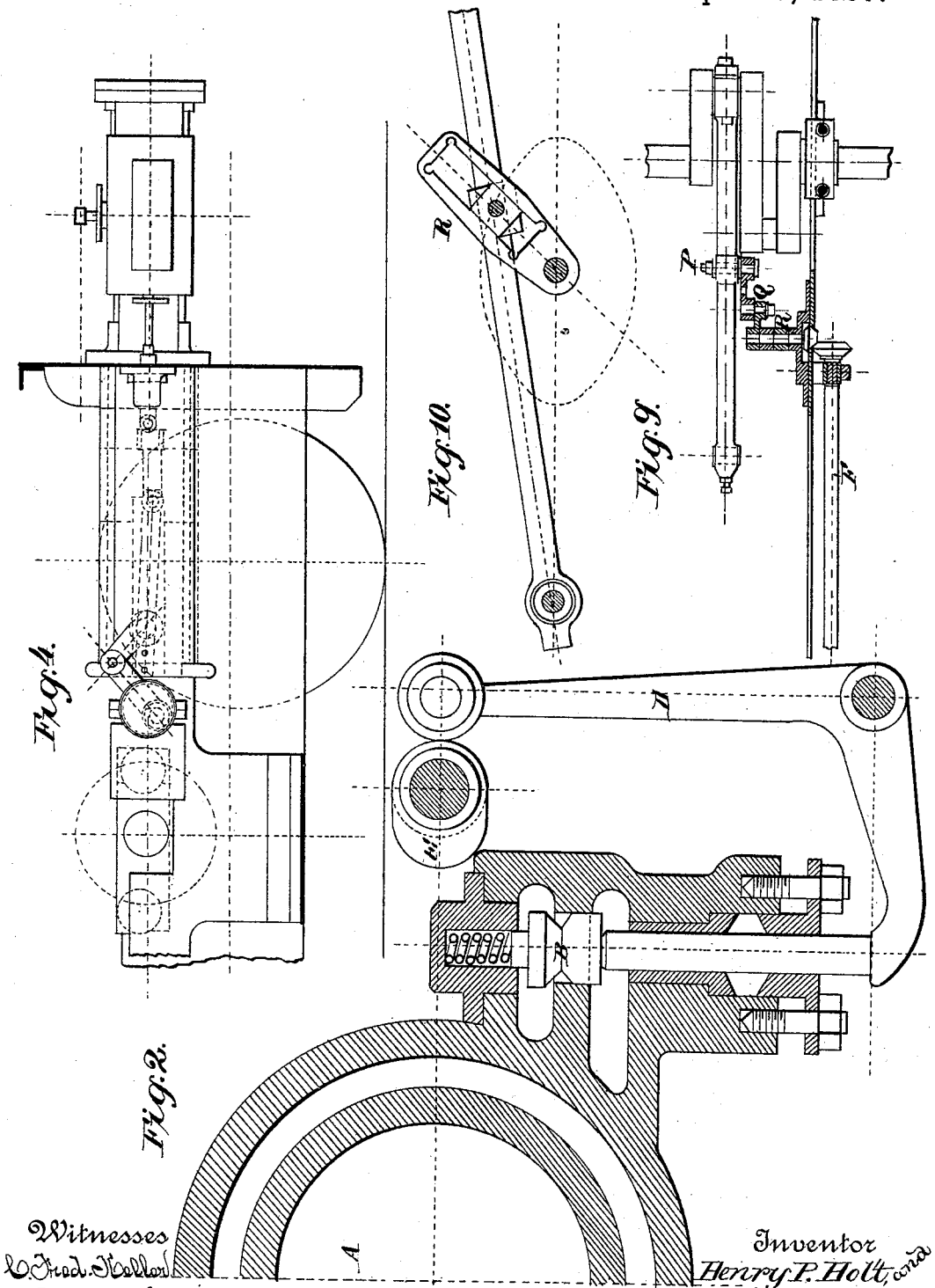

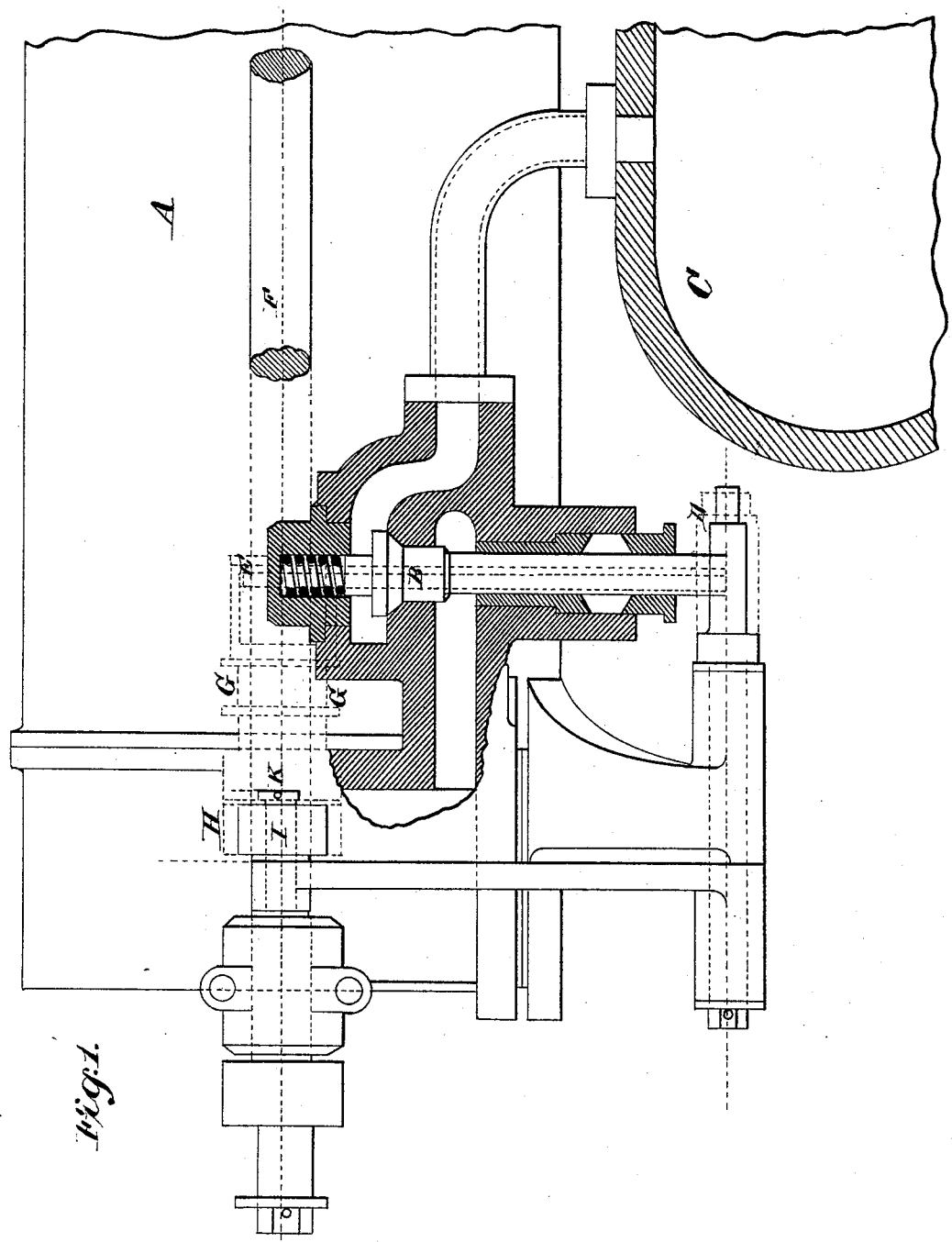

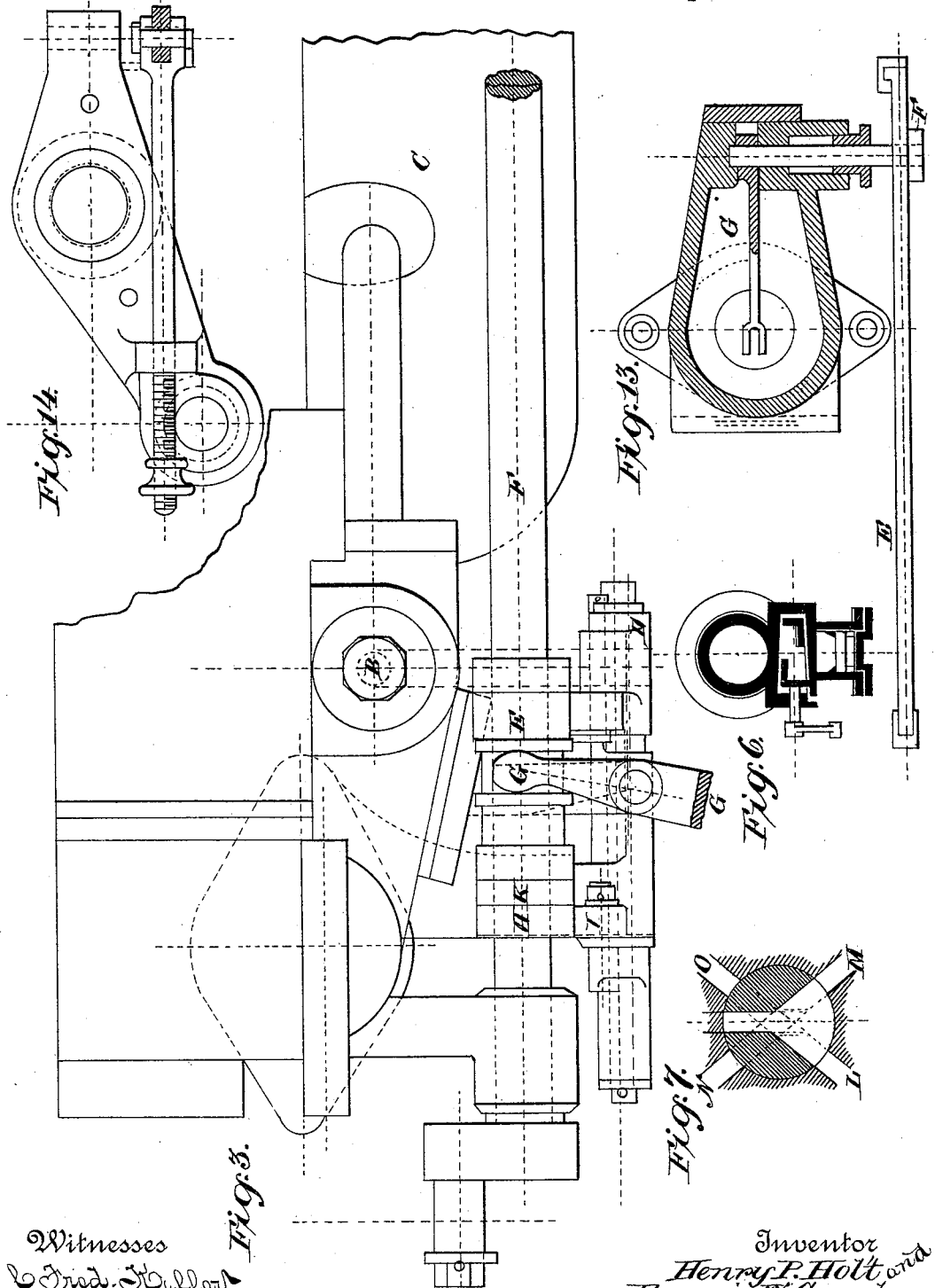

(No Model.) 6 Sheets—Sheet 4.
H. P. HOLT & F. W. CROSSLEY.
GAS MOTOR ENGINE.
No. 370,258. Patented Sept. 20, 1887.
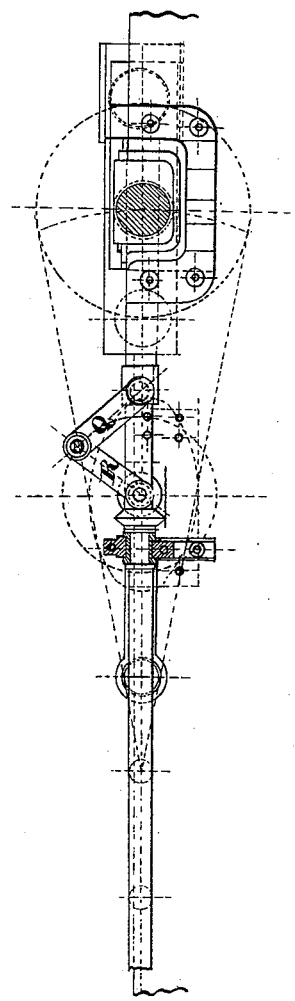
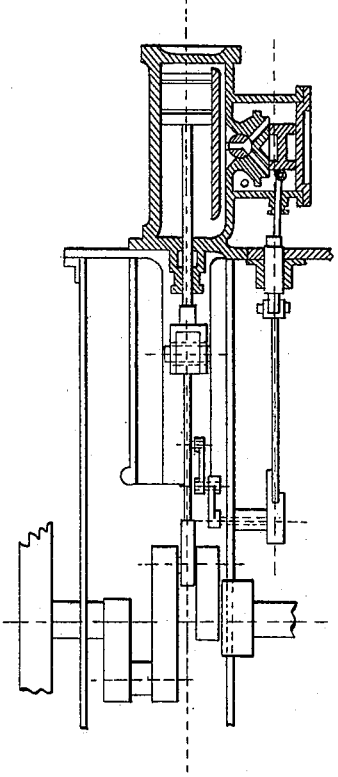
Witnesses:
Inventors,
Henry P. Holt and
Francis W. Crossley,
By their Attorney,

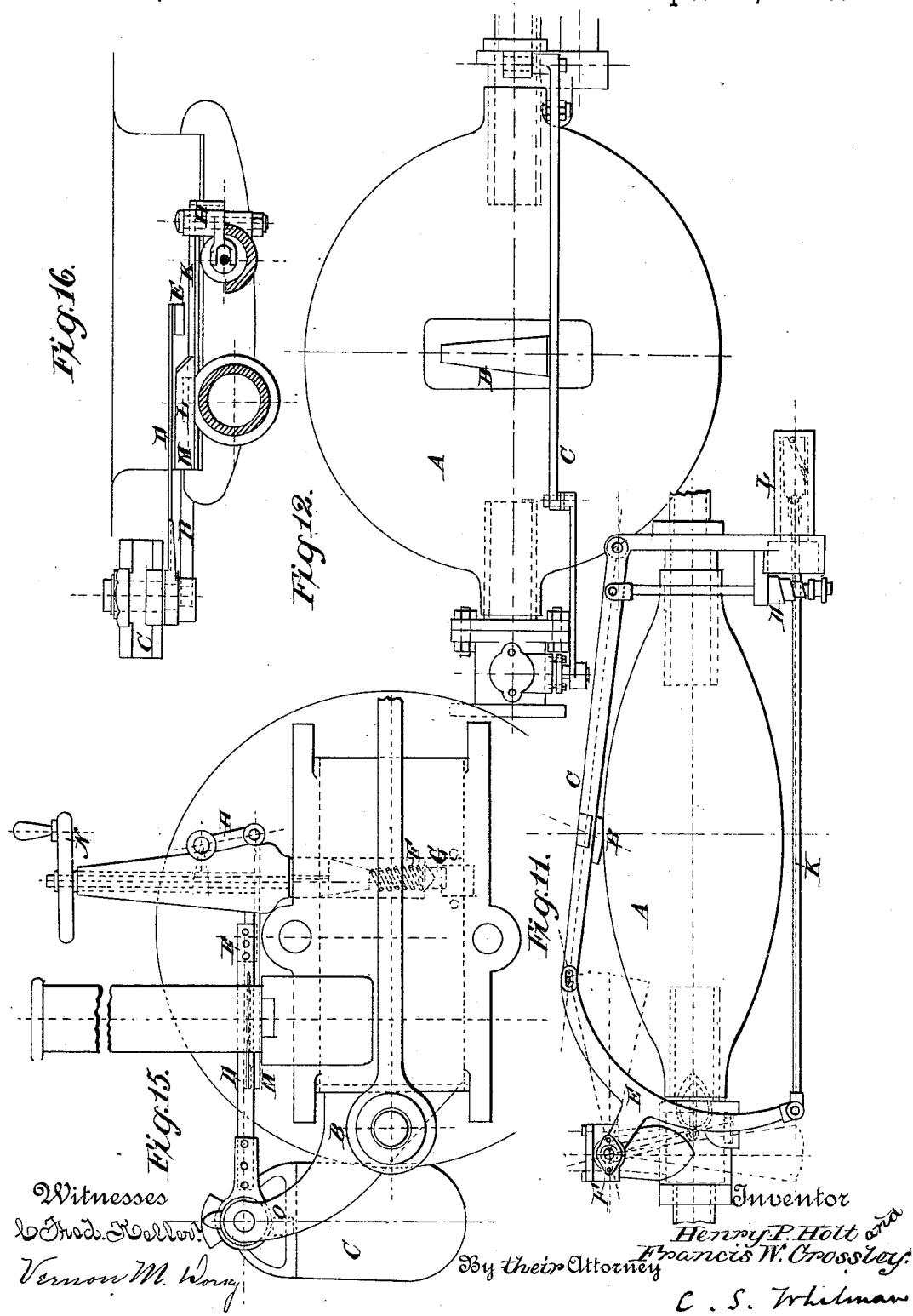

(No Model.) 6 Sheets—Sheet 6.
H. P. HOLT & F. W. CROSSLEY.
GAS MOTOR ENGINE.
No. 370,258. Patented Sept. 20, 1887.
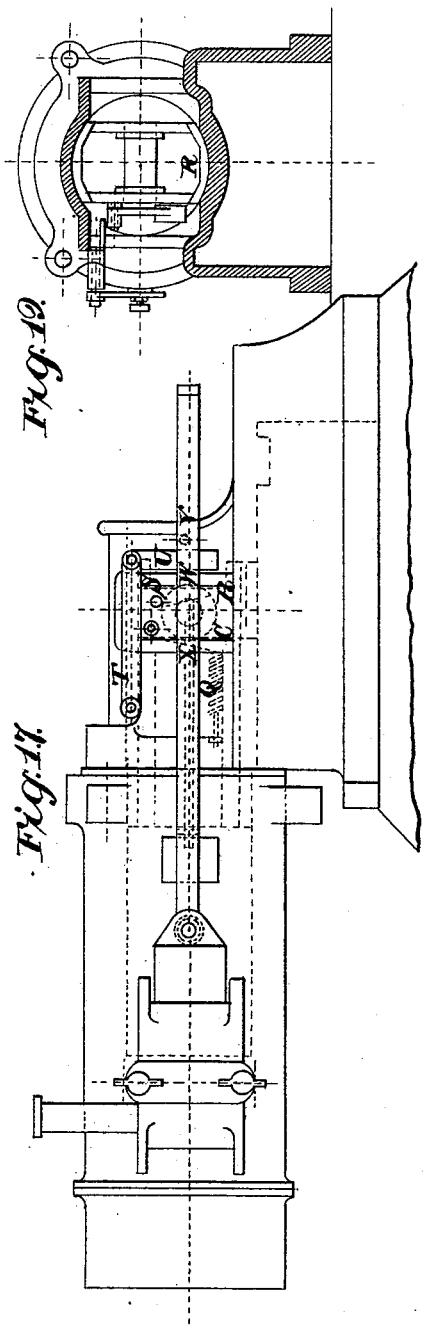
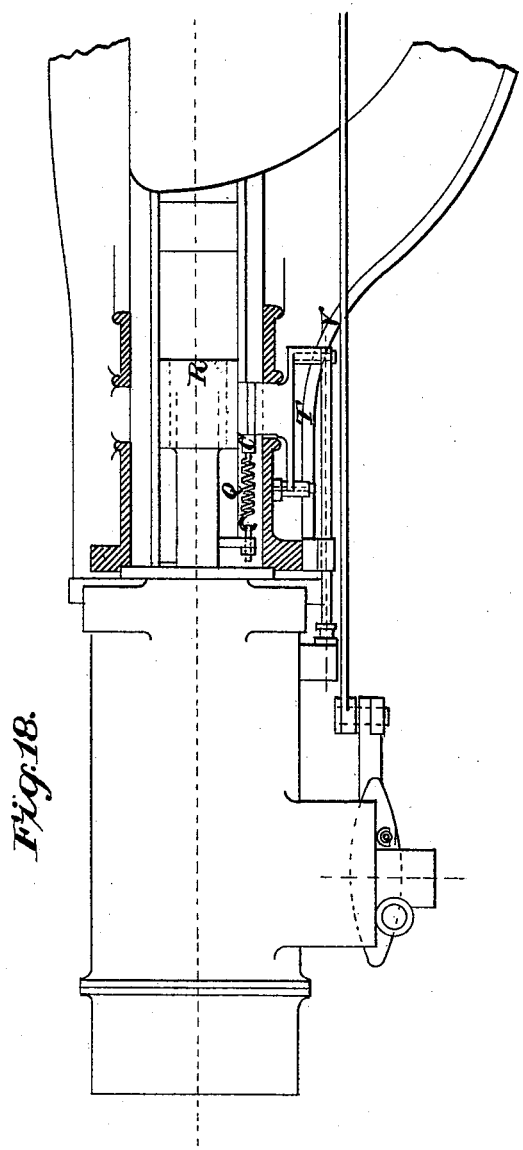

United States Patent Office.

HENRY P. HOLT, OF LEEDS, COUNTY OF YORK, AND FRANCIS W. CROSSLEY, OF MANCHESTER, COUNTY OF LANCASTER, ENGLAND.

GAS-MOTOR ENGINE.

SPECIFICATION forming part of Letters Patent No. 370,258, dated September 20, 1887.

Application filed November 6, 1886. Serial No. 218,199. (No model.) Patented in England January 27, 1881, No. 370.

*To all whom it may concern:*

Be it known that we, HENRY PERCY HOLT, of Leeds, in the county of York, and FRANCIS WILLIAM CROSSLEY, of Manchester, in the county of Lancaster, England, have invented certain new and useful Improvements in Gas-Motor Engines; and we do hereby declare the following to be a full, clear, and exact description of the invention, such as will enable others skilled in the art to which it appertains to make and use the same.

Our invention relates to gas-motor engines; and the nature thereof consists in certain improvements in the construction of the same, hereinafter described and claimed.

In the accompanying drawings, in which corresponding parts are designated by similar letters, Figure 1 is a side elevation, and Fig. 3 a plan, of part of the cylinder of an Otto gas-motor engine, with the reservoir for containing a store of elastic fluid under pressure. Fig. 2 is a transverse section through the valve, which can be opened by suitable gear during several successive propelling-strokes of the piston. Fig. 4 is a part elevation, Fig. 5 a sectional plan, and Fig. 6 a transverse section, showing a pump and its valve, which may be used for charging the reservoir. Fig. 7 is a section, to an enlarged scale, of a three-way cock introduced between the slide-valve and the cylinder. Fig. 8 is a front view, and Fig. 9 a plan, partly in section, of an arrangement by which we work the valves of the engine or pump, or both, either directly or from a counter-shaft worked from the connecting-rod of the engine or pump. Fig. 10 represents a slide working in a slotted hole. Fig. 11 is a side view, and Fig. 12 is a front view, of a regulating-bag. Fig. 13 is a sectional plan of the valve-box connecting the bag to the supply-pipe, and Fig. 14 is a plan of the connector and cataract at the other end of the bag. Fig. 15 is a side view, and Fig. 16 is a plan, of the governing apparatus as applied to the slide and gas valve of a gas-motor engine. Fig. 17 is a side view, Fig. 18 a plan, partly in section, and Fig. 19 a transverse section, showing a governor worked by the to-and-fro motion of the engine cross-head.

In order to aid in starting a gas-motor engine from a state of rest, we provide a strong reservoir containing a store of elastic fluid under pressure, and we arrange in communication from this reservoir to the working-cylinder of the engine a valve that can be opened by suitable gear during several successive propelling-strokes of the piston until the fly-wheel shall have received sufficient momentum to carry on the working of the engine in the regular way. When this arrangement is applied to gas-motor engines of the kind known as the "Otto" silent gas-engine, or similar engines, we admit a portion of the accumulated gaseous fluid into the engine-cylinder during such strokes as are not employed for drawing in charges or expelling products of combustion. In gas-motor engines in which the charges are compressed by the movement of the piston we connect the exhaust-valve to the valve-gear for admitting fluid from the reservoir in such a manner as to relieve the piston from the resistance of compression until the engine is started. In order to charge the reservoir above referred to, we, during the working of the engine, admit a portion of the burned expanded gases from its cylinder to the reservoir until it becomes charged to a pressure sufficient for afterward starting the engine, as above described.

Having reference to Figs. 1, 2, and 3, A is the cylinder of the engine, and B is a check-valve pressed by a spring in a passage leading from the cylinder to the reservoir C. The stem of the valve B is acted on by one arm of a lever, D, the other arm of which carries a roller bearing against a cam, E, on the counter-shaft F, which works the engine-slide. The cam E is fitted to a slide on a feather on the shaft F, and is provided with a collar and lever, G, by which it may be moved along the shaft. In the position shown it acts on the lever D when it is required to utilize the compressed fluid stored in the reservoir C for the purpose of starting the engine. In ordinary working the cam E is withdrawn, leaving the lever D inert.

The action is as follows: When the engine is at work, a portion of the burned gases from its cylinder, raising the check-valve B, passes into the reservoir C, raising the pressure therein till it becomes nearly equal to the maximum pressure in the cylinder, and the check-valve prevents return of the compressed fluid to the cylinder. When it is required to start the engine, the cam E is shifted by the hand-lever G to the position shown in Fig. 3, and the lever D is then caused to reciprocate once in every two revolutions of the engine-shaft, and the valve B, being thus intermittently raised, allows portions of the compressed fluid to pass from the reservoir C to the cylinder A and propel the piston. To the end of the cam E we attach a cam, H, corresponding with the exhaust-cam ordinarily used in such engines, so that while the cam E is acting to admit compressed fluid, to act in the cylinder at each propelling-stroke, the cam H, acting on the roller I of the exhaust-valve lever, opens the exhaust-valve during each compressing stroke as well as during each exhaust stroke. When the cam E is withdrawn from acting on the lever D, another part, K, of the exhaust-cam acts on the roller I for exhaust only. The reservoir C might be charged by a compressing-pump worked by the engine or otherwise; but we prefer to employ the means of charging it as above described. When a pump is employed for this purpose, it is advantageously arranged to counterbalance the reciprocating parts of the engine by working it by a crank opposite to that worked by the piston of the engine. When a pump is thus applied on a gas-motor locomotive, we provide means of inverting its motion, so that the pressure in the reservoir can, when required, be made available for working the pump, and thereby aiding the gas-motor engine—as, for example, when the locomotive has to ascend a gradient or turn a sharp curve.

Fig. 7 is a section, to an enlarged scale, of a three-way cock introduced between the slide-valve and the cylinder. The plug of this cock has through it passages which govern the two ports L and M from the slide and the two ports N and O to the cylinder of the pump. In one attitude of the plug the ports are so connected that the action is that of a pump charging the reservoir. In another attitude of the plug the ports are so connected on the piston as in a compressed-air engine propelling it. In the middle attitude of the plug, as shown in Fig. 7, there is a free communication from one end of the cylinder to the other, the piston thereby being rendered idle. In cases where space on the crank-shaft is limited, we work the valves of the engine or pump, or both, either directly or from a counter-shaft worked from the connecting-rod of the engine or pump.

Having reference to Figs. 8, 9, and 10, a point, P, in the connecting-rod, traveling in a path of quasi-elliptical form, is connected either by toggle-joints Q, as shown in Figs. 8 and 9, or by a slide working in a slotted hole, as shown in Fig. 10, to the crank R, causing it to revolve and drive the counter-shaft F, from which the valves are worked in the usual way. When the pipe supplying gas to a gas-motor engine supplies also lights or burners, these are apt to be affected by sudden changes of pressure caused by the indraft of the engine-charges. In order to obviate this, we provide a bag or collapsible vessel, such as is usually provided in the branch pipe leading to the engine, and we regulate the admission of the gas to this bag by a valve worked by a lever that bears against the side of the bag, so that as the bag is distended or collapsed this valve is moved. We control the movement of the valve by a cataract, which may be a disk moving loosely in an oil-cylinder, and we thereby prevent the sudden opening or closing of the valve, such as might otherwise result from the sudden changes of form which the bag might undergo.

Having reference to Figs. 11, 12, 13, and 14, A is the bag, against the side of which presses a pad, B, on a lever, C, the lever being drawn toward the bag by a spring, D. To the end of the lever C is linked one arm of a lever, E, fixed on a rocking spindle, F, to the arm G of which is linked the conoidal supply-valve H. This valve is, by means of the connections shown, opened when the bag collapses and closed when the bag becomes distended. To prevent sudden movements of the valve, an arm of the lever E is connected by a rod, K, to a piston or plunger working loosely in a liquid in a cylinder, L.

In gas-motor engines in which the gas-supply valve is moved by a reciprocating rod or port, we govern the gas supply so as either to give full supply or none, according as the engine is moving at normal or excessive speed, by means of a governing apparatus, which will be described, referring to Fig. 15, which is a side view, and Fig. 16, which is a plan of the apparatus as applied to the slide and gas valve of a gas-motor engine of the kind known as the "Otto" silent engine.

A is the reciprocating admission and ignition slide. On a bracket, B, projecting therefrom we suspend a weight, C, which has a horizontal arm terminating in a sharp-edge plate, E.

G is the gas-supply valve, which is pressed down by a spring, F, and raised by the short arm of a bent lever, H, acting on a collar on the valve-rod. From the long arm of the lever H extends a rod, K, fitted to slide horizontally in guides, and having at its end a plate, on the under side of which is a thin projecting part grooved at the edge. When the slide A moves at its normal speed in making its strokes in the direction of the arrow, the hanging weight C moves with it without swinging out of its vertical attitude, and the plate E on its arm D then passes just under the guide-plate L and engages in the groove of M, and the rod K being by the continued movement of A thus pushed toward the left, the gas-valve G is opened. Should the slide A, in consequence of excessive speed of the engine, make its strokes too rapidly, then the weight C, in consequence of its inertia, will swing relatively toward the right, and the plate E will thus be made to pass above the guide-plate L. As in this movement the plate E escapes the groove of M, the gas-valve G will not be moved. For stopping the engine, the gas-valve G may be disconnected from its opening apparatus by turning the hand-wheel N, and thus raising the collar on which the lever H acts. To prevent the weight C from swinging toward the left, it is provided with a stop, O, meeting a corresponding stop, P, on the bracket B.

The arrangement of governor above described may be modified, as in Fig. 17, which is a side view, Fig. 18, which is a plan, partly in section, and Fig. 19, which is a transverse section showing such a governor worked by the to-and-fro motion of the engine cross-head. In this case the suspended weight C is retained against a stop by a spring, Q; but when the cross-head R, on which C is suspended, retreats too rapidly, the weight C, swinging a little toward the right by means of a short arm, S, raises a horizontal lever, T, and bar U, suspended therefrom behind a stud on the slide-rod V. The bar U has projecting from it a sharp-edge plate, W, which is thus made to miss the mark X of the gas-valve rod when the bar U is pushed back by the stud on the slide-rod V.

In order to prevent escape of gas when the engine accidentally stops, and when it may happen that the gas-supply is left open, we provide in the air-supply pipe a check-valve, which can open for indraft of air, but closes automatically against issues of gas from the cylinder and slide.

Having thus described the nature of our invention and in what manner the same is to be performed, we claim—

1. In a gas-motor engine, the combination of a check-valve with a movable cam, whereby the valve may, when required for starting the engine, receive movements suitable for the admission of compressed fluid from the reservoir to the cylinder, substantially as described.

2. The combination of a regulating-valve controlled by a cataract with a collapsible bag on a supply-pipe of a gas-motor engine, as and for the purpose herein set forth.

3. A weight for governing a gas-motor engine, suspended to a reciprocating part, which weight, when the speed is excessive, by its inertia causes the reciprocating part to miss opening the gas-supply valve, substantially as herein described.

In testimony whereof we affix our signatures in presence of two witnesses.

HENRY P. HOLT.
F. W. CROSSLEY.

Witnesses:
 CHAS. BYTHWAY,
  *Solicitor, Manchester.*
 G. E. AUDERTON,
  *Clerk, Openshaw, near Manchester.*